(12) United States Patent
White et al.

(10) Patent No.: US 6,306,467 B1
(45) Date of Patent: Oct. 23, 2001

(54) METHOD OF SOLID FREE FORM FABRICATION OF OBJECTS

(75) Inventors: Dawn Roberta White, Ann Arbor; Daniel Edward Wilkosz, Ypsilanti; Sankaran Subramaniam, Farmington, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/332,437

(22) Filed: Jun. 14, 1999

(51) Int. Cl.[7] .............. B05D 1/36; B05D 1/04; B22D 23/04; C23C 4/06
(52) U.S. Cl. .......... 427/470; 427/466; 427/564; 427/422; 427/427; 164/46; 164/459; 164/488
(58) Field of Search ............ 427/449, 455, 427/466, 470, 475, 422, 561, 564, 469, 427; 264/401; 219/121.47, 121.46; 164/489, 488, 47, 459, 466, 46

(56) References Cited

U.S. PATENT DOCUMENTS

| | | | |
|---|---|---|---|
| H872 | * 1/1991 | Hendricks | 427/561 |
| Re. 35,411 | 12/1996 | Ashok et al. . | |
| 1,128,175 | * 2/1915 | Morf | 164/46 |
| 1,654,509 | * 12/1927 | Claus | 164/46 |
| 2,972,185 | * 2/1961 | Brennan | 427/422 |
| 3,222,776 | * 12/1965 | Kawecki | 164/46 |
| 4,464,414 | * 8/1984 | Milewski et al . | 427/455 |
| 4,917,170 | 4/1990 | Sankaranarayanan et al. . | |
| 4,941,928 | * 7/1990 | Ammon et al. | 427/422 |
| 5,126,529 | 6/1992 | Weiss et al. . | |
| 5,171,360 | * 12/1992 | Orme et al. | 164/46 |
| 5,176,874 | 1/1993 | Mourer et al. . | |
| 5,260,009 | 11/1993 | Penn . | |
| 5,268,018 | 12/1993 | Mourer et al. . | |
| 5,301,415 | 4/1994 | Prinz et al. . | |
| 5,398,193 | 3/1995 | deAngelis . | |
| 5,520,715 | * 5/1996 | Oeftering | 427/565 |
| 5,614,022 | * 3/1997 | Vatavuk et al. | 427/449 |
| 5,669,433 | 9/1997 | Sterett et al. . | |
| 5,718,951 | * 2/1998 | Sterett et al. | 427/466 |
| 5,722,479 | 3/1998 | Oeftering . | |
| 5,746,844 | * 5/1998 | Sterett et al. | 427/466 |
| 5,746,966 | 5/1998 | McDonald . | |
| 5,772,106 | 6/1998 | Ayers et al. . | |
| 5,787,965 | 8/1998 | Sterett et al. . | |
| 5,807,437 | 9/1998 | Sachs et al. . | |
| 5,837,960 | 11/1998 | Lewis et al. . | |
| 6,221,438 | * 4/2001 | Matthies | 427/466 |

\* cited by examiner

Primary Examiner—Marianne Padgett
(74) Attorney, Agent, or Firm—Damian Porcari

(57) ABSTRACT

A method of solid free form fabrication of an object includes the steps of providing a substrate, forming a plurality of molten droplets, and spraying the molten droplets upward against the substrate to form a net shape object.

20 Claims, 2 Drawing Sheets

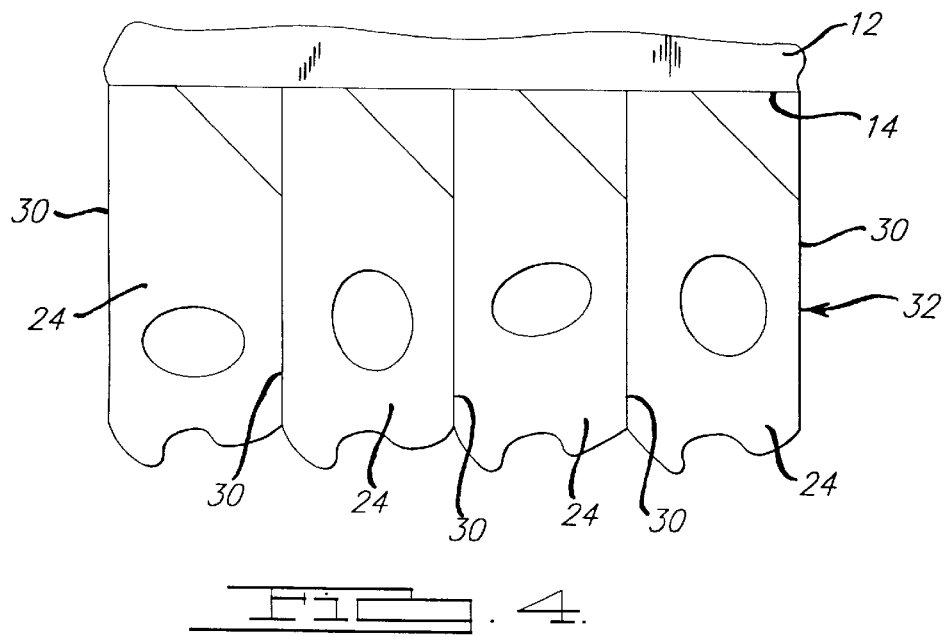
FIG. 4.
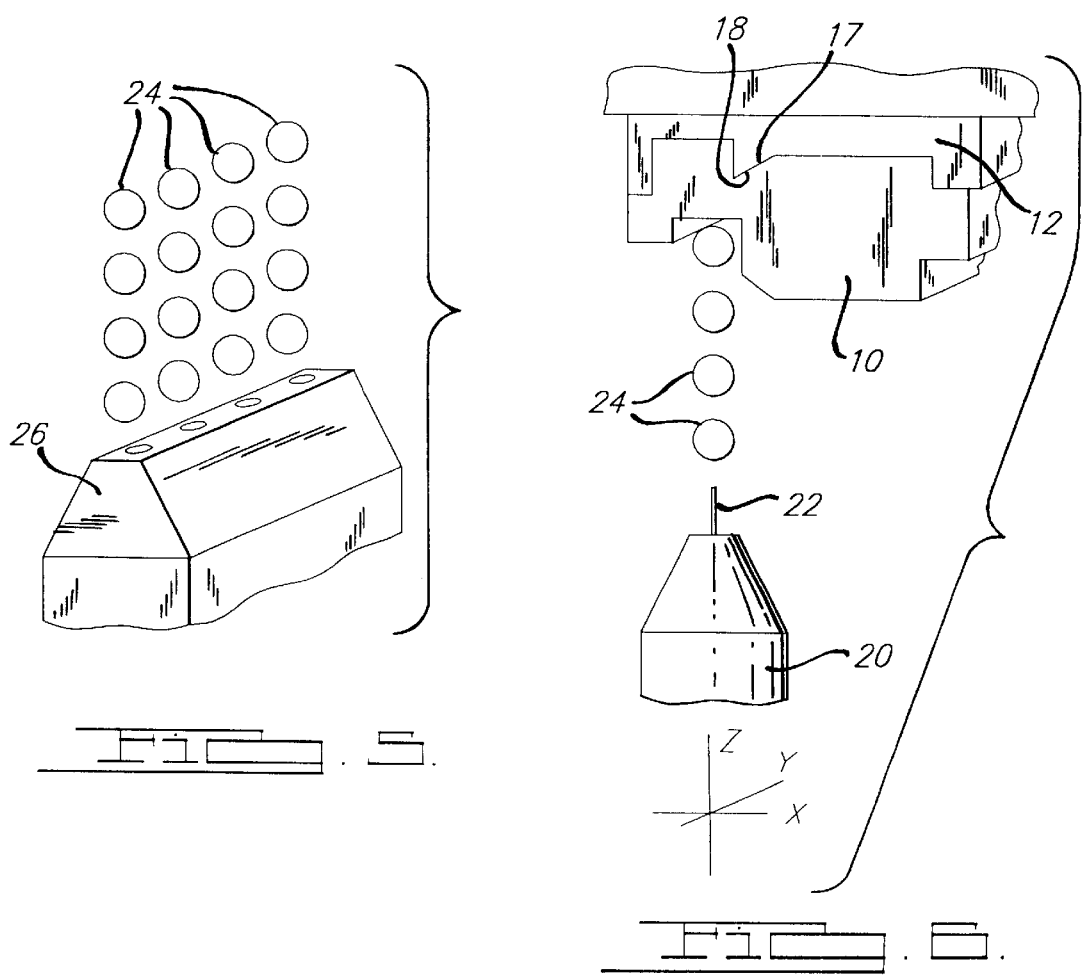
FIG. 5.
FIG. 6.

METHOD OF SOLID FREE FORM FABRICATION OF OBJECTS

BACKGROUND OF THE INVENTION

1. Field of the Invention

The present invention relates generally to solid free form fabrication of objects and, more specifically, to a method of solid free form fabrication of an object.

2. Description of the Related Art

It is known to free-form three-dimensional objects by sequential deposition of molten droplets, falling towards a substrate. Such known examples are disclosed in U.S Pat. Nos.: 5,787,965; 5,807,437; and 5,837,960. During the free-form fabrication process, the molten droplets are formed and projected downward on a substrate to produce a free-form three-dimensional object or rapid tool. When such molten droplets impinge on the substrate, the force of gravity acting on the droplets prior to final solidification of the molten material produces spreading of the droplet, while surface tension acts to contain the liquid volume. This results in an irregularity on an outer surface of the object, which requires finishing of some kind prior to use.

The droplet's velocity also impacts the degree of spreading which occurs, as does the relative amounts of liquid and solid material present in the molten droplet. If the molten droplet is relatively cold, the deposit which forms will have discrete droplets whose outer surface is relatively easily predicted and controlled, however, the interdroplet spaces will be porous, due to the non-fluid nature of the molten droplet. On the other hand, if the molten droplets are highly fluid, they will splat outward, creating a surface, which has inaccurate dimensional control, although porosity will be minimized.

Although the above process has worked well, it desirable to produce a solid free form sprayed object with a smoother and more dimensionally controlled surface. It is also desirable to produce better deposits of the molten droplets when spraying a free-formed object. It is a further object of the present invention to free form an object and eliminate secondary finishing operations.

SUMMARY OF THE INVENTION

Accordingly, the present invention is a method of solid free form fabrication of an object. The method includes the steps of providing a substrate, forming a plurality of molten droplets, and spraying the molten droplets upward against the substrate to form a net shape object.

One advantage of the present invention is that a method is provided of solid free form fabrication of an object by inverted spraying. Another advantage of the present invention is that the method sprays molten droplets upward to allow surface tension and gravity to produce smooth sides on the object built up by the deposited droplets. Yet another advantage of the present invention is that the method allows gravity to elongate the molten droplets, producing a more desirable geometry and better deposits than conventional techniques in which molten droplets spread due to gravity, producing porosity or poor geometry. Still another advantage of the present invention is that the method produces dimensional control in spray formed objects for rapid tools.

Other features and advantages of the present invention will be readily appreciated, as the same becomes better understood after reading the subsequent description taken in conjunction with the accompanying drawings.

BRIEF DESCRIPTION OF THE DRAWINGS

FIG. 4 is a diagrammatic view of pendant buildup formed by the method of FIG. 1.

FIG. 5 is a diagrammatic view of an apparatus producing a linear spray for carrying out a step of spraying of the method of FIG. 1.

FIG. 6 is a view similar to FIG. 1 of free form fabrication of an object on a featured substrate.

DESCRIPTION OF THE PREFERRED EMBODIMENT(S)

Figures 1, 2:
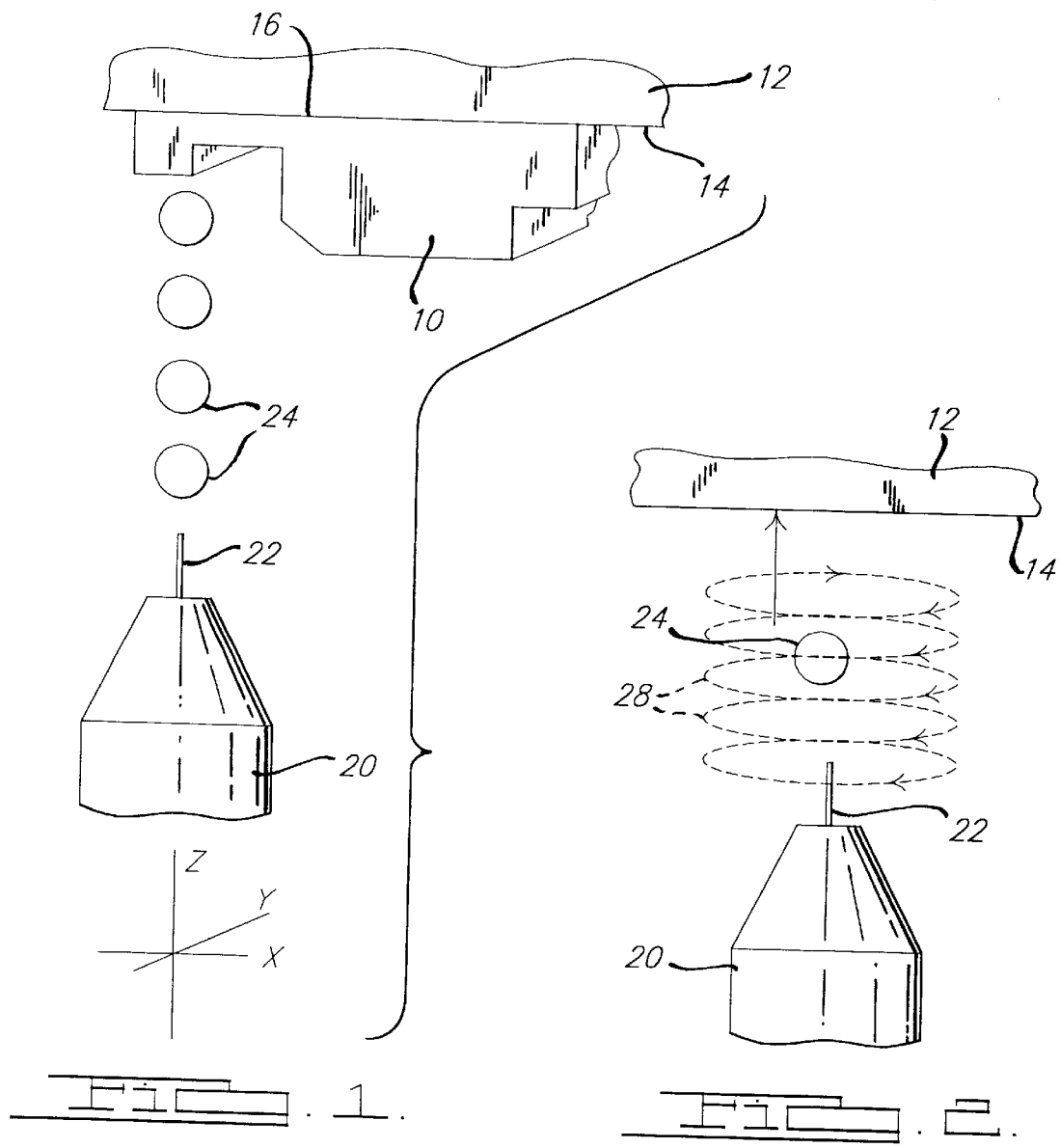
FIG. 1 is a diagrammatic view of an apparatus for carrying out a method, according to the present invention, of solid free form fabrication of an object on a planar substrate.
FIG. 2 is a diagrammatic view of the apparatus carrying out a step of spraying of the method of FIG. 1.

Referring to the drawings and in particular FIG. 1 through 4, one embodiment of a method of solid free form fabrication of an object or rapid tool 10, according to the present invention, is shown. The method begins by providing a substrate 12. The substrate 12 may be of a planar type having a relatively flat surface 14 to form a flat bottom surface 16 on the object 10. Alternatively, if the object 10 must have features 17 on its bottom, the substrate 12 may be of a featured type having a relatively irregular surface 18 which incorporates a reverse of the features desired in the completed object as illustrated in FIG. 6. The substrate 12 may be made of a suitable material such as ceramic. It should be appreciated that if features are desired on the sides of the object being built a secondary material such as a fast drying ceramic or foundry sand could be built into the emerging structure to provide support for the features. It should also be appreciated that this secondary material would be removed prior to use.

The method includes the step of forming molten droplets and spraying the molten droplets upward against the substrate 12 to form a net shape object 10 as illustrated in FIG. 1. As illustrated in FIGS. 1 and 2, an apparatus is shown for carrying out the steps of forming and spraying. The apparatus is a conventional arc-welding torch 20, in this example, and the metal material is welding wire 22. The welding torch 20 melts the welding wire 22 and forms at least one, preferably a plurality of molten droplets 24. As illustrated, the molten droplets 24 may be formed in a single droplet spray of uniform consistent droplets. Alternatively, an apparatus 26 may form the molten droplets 24 in a linear spray of uniform consistent droplets as illustrated in FIG. 5. It should be appreciated that the spray must be precise in order to produce a shape without a mold.

Figure 3:
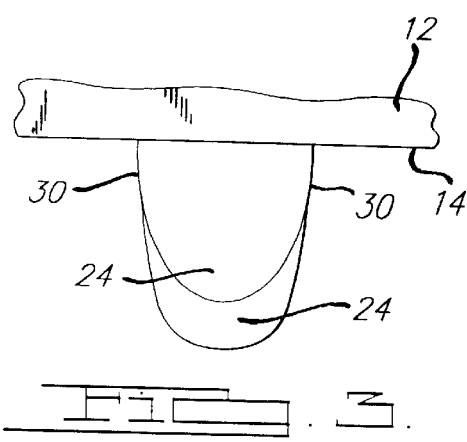
FIG. 3 is a diagrammatic view of a pendant droplet formed by the method of FIG. 1.

The welding torch 20 projects a narrow spray of molten droplets 24 upward against the surface 14 of the substrate 12. The welding torch 20 generates electromagnetic forces, indicated by the dotted lines at 28, on the molten droplet 24 and these forces exceed gravitational and surface tension forces on the molten droplet 24 to move the molten droplet 24 upward. The molten droplet 24 impinges the surface 14 and gravity pulls downward on the molten droplet 24 as it solidifies, elongating its shape to produce the pendent droplet 24 as illustrated in FIG. 3. The pendent droplet 24 has at least one edge or side 30, which is relatively planar or flat over some distance thereof. As illustrated in FIG. 4, each of the molten droplets 24 will buildup sequentially on the surface 14 and produce a pendant structure, generally indicated at 32, with smooth, accurate surfaces and lack of porosity, due to smooth sides 30 of the molten droplets 24. It should be appreciated that by consecutively placing such relatively flat molten droplets 24, both surface quality and dimensions can be controlled in a net shape deposit to produce a net shape object.

Alternatively, the narrow spray of molten droplets 24 may be generated by laser melting of wires and powders or piezo electric stimulation of a thin column of liquid metal. Also, the step of projecting these droplets upward may be carried out by gas jets, electromagnetic fields, and the like to direct the molten droplets 24 upward once generated. It should be appreciated that the substrate 12 is held by a fixture (not shown) to allow inverted spraying of the spray material. It should also be appreciated that one skilled in the art could use many possible droplet formation and projection techniques.

Materials usable for spraying include metals, ceramics, and plastics where sagging of the deposit prior to solidification causes geometrical inaccuracy and surface roughness. Preferably, metals are used and include those such as zinc and high temperature high strength carbon steel. These include certain tool steels such as A2 and plain carbon steel with (0.8% carbon by weight) as well as maraging steels. Maraging steels are difficult to machine and are seldom used for tooling, but can be readily spray formed to produce a desirable microstructure.

After the completed object 10 is built, the substrate 12 is removed. The completed object 10 may be a rapid tool used in a die-set mold mounted in an injection molding machine (not shown) and used to produce molded parts. It should be appreciated that the completed object 10 may be a tool used for stamping, die casting, blow molding or other material forming operations. It should also be appreciated that the completed object 10 may be an object for use as a test component or for product use.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of solid free form fabrication of an object comprising the steps of:
   providing a substrate;
   forming a plurality of molten droplets; and
   spraying the molten droplets upward and moving the molten droplets upward against gravitational forces and surface tension forces on the molten droplets to impinge against a surface of the substrate and allowing gravity to pull downward on the molten droplets to elongate the molten droplets as the molten droplets solidify to form a net shape deposit to produce a completed object.

2. A method as set forth in claim 1 wherein said step of forming comprises forming a single droplet spray of uniform consistent size molten droplets.

3. A method as set forth in claim 1 wherein said step of forming comprises forming a droplet spray of uniform consistent size molten droplets in a linear progression of droplets on the way to the substrate.

4. A method as set forth in claim 1 including the step of producing a pendent droplet having at least one edge which is relatively planar during said step of spraying.

5. A method as set forth in claim 1 including the step of sequentially depositing relatively flat droplets on the substrate during said step of spraying.

6. A method as set forth in claim 1 wherein said substrate comprises a planar substrate having a relatively flat surface or a featured substrate having a relatively irregular surface.

7. A method as set forth in claim 1 wherein said step of spraying further comprises generating electromagnetic forces on the molten droplets and moving the molten droplets upward toward the substrate.

8. A method as set forth in claim 7 wherein said step of spraying further comprises impinging the molten droplets on the substrate and producing a pendant structure.

9. A method as set forth in claim 8 wherein the pendant structure has relatively smooth sides.

10. A method of forming a spray formed tool comprising the steps of:
    providing a substrate;
    forming a plurality of molten droplets;
    spraying the molten droplets upward and moving the molten droplets upward against gravitational forces and surface tension forces on the molten droplets to impinge against a surface of the substrate;
    sequentially depositing the molten droplets on the substrate; and
    allowing the molten droplets to hang from the substrate with gravity acting downward to elongate the molten droplets as the molten droplets solidify to form a shaped tool.

11. A method as set forth in claim 10 wherein the molten droplets have at least one edge which is relatively planar during said step of allowing.

12. A method as set forth in claim 10 wherein said step of sequentially depositing comprises consecutively placing relatively flat molten droplets on the substrate.

13. A method as set forth in claim 10 wherein said substrate comprises a planar substrate having a relatively flat surface or a featured substrate having a relative irregular surface.

14. A method as set forth in claim 10 wherein said step of spraying further comprises generating electromagnetic forces on the molten droplets and moving the molten droplets upward toward the substrate.

15. A method as set forth in claim 10 wherein said step of spraying further comprises impinging the molten droplets on the substrate to produce a pendant structure.

16. A method as set forth in claim 15 wherein the pendant structure has relatively smooth sides.

17. A method of forming a spray formed tool comprising the steps of:
    providing a substrate;
    forming a plurality of molten metal droplets;
    generating electromagnetic forces on the molten metal droplets and moving the molten metal droplets upward against gravitational forces and surface tension forces on the molten droplets toward the substrate, impinging the molten metal droplets on the substrate and allowing gravity to pull downward on the molten metal droplets to elongate the molten metal droplets as the molten metal droplets solidify and producing pendant droplets to form a shaped structure.

18. A method as set forth in claim 17 wherein said substrate comprises providing a planar substrate having a relatively flat surface.

19. A method as set forth in claim 17 wherein said substrate comprises providing a featured substrate having a relatively irregular surface.

20. A method as set forth in claim 17 wherein the pendant structure has relatively smooth sides.

* * * * *